United States Patent [19]

Yamada

[11] Patent Number: 5,521,842
[45] Date of Patent: May 28, 1996

[54] DIAGNOSTIC DEVICE AND A DATA COMMUNICATION SYSTEM FOR USE WITH THE DIAGNOSTIC DEVICE

[75] Inventor: Junichi Yamada, Tokyo, Japan

[73] Assignee: Fuji Photo Co., Ltd., Kanagawa, Japan

[21] Appl. No.: 157,273

[22] Filed: Nov. 26, 1993

[30] Foreign Application Priority Data

Nov. 25, 1992 [JP] Japan .................................. 4-315104

[51] Int. Cl.⁶ .................................................. G06F 17/00
[52] U.S. Cl. .................................................. 364/514 B
[58] Field of Search ............................ 364/514 B, 276.3, 364/554; 371/16, 29.1, 15.1, 4

[56] References Cited

U.S. PATENT DOCUMENTS

| | | | |
|---|---|---|---|
| 4,964,125 | 10/1990 | Kim | 371/29.1 |
| 5,005,143 | 4/1991 | Altschuler et al. | 364/554 |
| 5,109,380 | 4/1992 | Ogino | 371/15.1 |
| 5,127,005 | 6/1992 | Oda et al. | 364/276.3 |
| 5,166,934 | 11/1992 | Tomiyama et al. | 364/276.3 |

FOREIGN PATENT DOCUMENTS

0231048  10/1991  Japan .............................. 340/825.15

OTHER PUBLICATIONS

Anderson et al.; "Error Controls"; IBM Technical Disclosure; vol. 16, No. 6, Nov. 1973.

Moran; "Coming: self–diagnosing disks"; Computer and Communications Decisions, Jun. 1987.

Frechette et al; "Support Processor Analyzes Errors Caught by latches"; Electronics, Nov. 8, 1979.

Marques; "A Sympton–Driven Expert System for Isolating and Correcting Network Faults"; IEEE 1988.

Stringfellow et al; "Maintenance Scanner"; IBM Technical Disclosure; vol. 3, No. 2, 1961.

Emerick et al; "Error Log Analysis"; IBM Technical Disclosure Bulletin; vol. 23, No. 12, 1981.

*Primary Examiner*—Ellis B. Ramirez
*Attorney, Agent, or Firm*—Sughrue, Mion, Zinn, Macpeak & Seas

[57] ABSTRACT

A diagnostic device displays at least an optimum countermeasure in response to a failure code inputted in accordance with a failure of a machine, as a result of searching a countermeasure map, in which each failure code is associated with at least a countermeasure code. After taking a countermeasure with reference to display of the diagnostic device, the repairer inputs a countermeasure code corresponding to the taken countermeasure and a result code indicating the result of the countermeasure. The failure code, the countermeasure code and the result code are stored as repair data in the diagnostic device. The repair data is sent to a host computer over a telephone line. The host computer gathers the statistics of the repair data to revise the countermeasure map.

12 Claims, 5 Drawing Sheets

FIG. 4

MACHINE TYPE 0001

RESULT OF SEARCH

| FAILURE | COUNTERMEASURE | SUCCESS PROBABILITY(%) |
|---------|----------------|------------------------|
| A A A A | X | 86 |
|         | Y | 50 |
|         | C | 33 |

FIG. 5

| MACHINE TYPE CODE | FAILURE CODE | COUNTERMEASURE CODE | SUCCESS PROBABILITY(%) |
|-------------------|--------------|---------------------|------------------------|
| 0 0 0 1 | A A A A | X | 86 |
|         | A A A A | Y | 50 |
|         | A A A A | C | 33 |
|         | A B B B | Y | 100 |
|         | A C C C | Y | 100 |
|         | C A A A | Y | 0 |
| 0 0 0 3 | A A A A | C | 0 |
|         | D E A C | X | 0 |
| 0 0 0 5 | G F E S | C | 0 |
| . . . . | . . . . | . | . . |
| . . . . | . . . . | . | . . |

FIG. 6

| MACHINE TYPE CODE | FAILURE CODE | COUNTERMEASURE CODE | RESULT CODE |
|---|---|---|---|
| 0001 | A A A A | X | O K |
| 0001 | A B B B | Y | O K |
| 0001 | A A A A | C | N G |
| 0001 | A A A A | Y | N G |
| 0001 | A A A A | X | O K |
| 0003 | A A A A | C | N G |
| 0001 | A A A A | X | O K |
| 0001 | A C C C | Y | O K |
| 0001 | A A A A | Y | N G |
| 0001 | A A A A | X | O K |
| 0001 | A C C C | Y | O K |
| 0005 | G F E S | C | N G |
| 0001 | A A A A | X | O K |
| 0001 | C A A A | Y | N G |
| 0001 | A A A A | X | N G |
| 0001 | A A A A | X | O K |
| 0001 | A A A A | C | O K |
| 0001 | A A A A | Y | O K |
| 0001 | C A A A | Y | N G |
| 0001 | A A A A | Y | O K |
| 0001 | A B B B | X | N G |
| 0003 | D E A C | X | N G |
| 0001 | A A A A | C | N G |
| . . . . . | . . . . . | . | . . |
| . . . . . | . . . . . | . | . . |

5,521,842

DIAGNOSTIC DEVICE AND A DATA COMMUNICATION SYSTEM FOR USE WITH THE DIAGNOSTIC DEVICE

BACKGROUND OF THE INVENTION

1. Field of the Invention

The present invention relates to a portable diagnostic device and a data communication system for use with this device. The present invention relates more particularly to a portable diagnostic device for determining an optimum countermeasure for a failure of a machine, for example, a photographic process, and also relates to a data communication system for collecting data relating to failures from these diagnostic devices.

2. Description of the Related Art

In the field of photographic processors, for instance, corrective maintenance is conventionally performed as follows.

When a user of a photographic processor makes a request for repair of the processor, a representative of the manufacturer or repair service visits the site with a repair manual. The representative, or repairer, refers to the manual to search out several types of failures and corresponding countermeasures, and takes possible steps to cope with the failure. After repairing the photographic processor, the repairer fills out a service order including the name of the user, the type or number of the repaired apparatus, the type of the failure and the countermeasure, the time taken for the repair, and so forth. A copy of the service order is forwarded to the user for confirmation, and another copy is forwarded to a corrective maintenance department of the manufacturer or repair service. A copy of the service order is also sent to the technical service headquarters of the manufacturer. In the technical service headquarters, the work orders having been sent from many offices are utilized for compiling technical data in the interest of revising the repair manual for the repairers as well as improving the quality and development new photographic processors. The necessary data contained in the service orders is manually coded and inputted into a computer.

However, it is very tedious to retrieve information about optimum measures from the repair manual. Also the manual data input process in the technical headquarters is time-consuming. Furthermore, since the work orders are forwarded to the technical headquarters by way of a branch office or a local main agency of the manufacturer, there is a certain time lag in the data collection.

SUMMARY OF THE INVENTION

In view of the foregoing, an object of the present invention is to provide a diagnostic device which facilitates discovery of an optimum countermeasure for a failure.

Another object of the present invention is to provide a data communication system which enables quick collection of data about failures and repairs.

To achieve the above objects, a diagnostic device of the present invention provides a map memory storing a countermeasure map, in which many kinds of failure codes representing various failures are each associated with at least a countermeasure code representing a possible countermeasure and a probability of success of the possible counter measure, a data input unit for inputting data in form of codes, a search unit searching the countermeasure map in response to a search code including one of the failure codes which is inputted through the data input unit in accordance with the actual failure, to read at least a first one of the countermeasure codes assigned to the first failure code. A display unit displays at least data of an optimum countermeasure represented by the first countermeasure code and the success probability of the countermeasure.

A data memory is provided for storing repair data inputted through the data input means after each countermeasure has been taken according to the data displayed on the display means. The repair data is constituted of at least the first failure code, the first countermeasure code, and a result code representing whether or not the countermeasure taken was successful.

The present invention also provides a data communication system between the above described diagnostic devices and a host computer, which includes a terminal connectable to the diagnostic devices, and a modem for connecting the terminal to a host computer through a telephone line, to send the repair data from the diagnostic devices to the host computer over the telephone line. The host computer statistically processes the repair data to compile the countermeasure map.

Because the diagnostic device of the invention displays possible countermeasures along with their success probabilities upon inputting a search code, an optimum countermeasure can be quickly found. Because the repair data is sent from the diagnostic device to the host computer over a telephone line, the statistics of the repair data are compiled quickly.

BRIEF DESCRIPTION OF THE DRAWINGS

Other objects and advantages of the present invention will become apparent in the following detailed description of the preferred embodiments when read in connection with the accompanying drawings, wherein like reference numerals designate like or corresponding parts throughout the several views, and wherein:

FIG. 4 is a view of an example of display on the liquid crystal display section, showing a result of a search;

FIG. 5 is an explanatory view of data of the countermeasure map; and

FIG. 6 is an explanatory view of repair data stored in the diagnostic device.

DESCRIPTION OF THE PREFERRED EMBODIMENT

Figure 1:
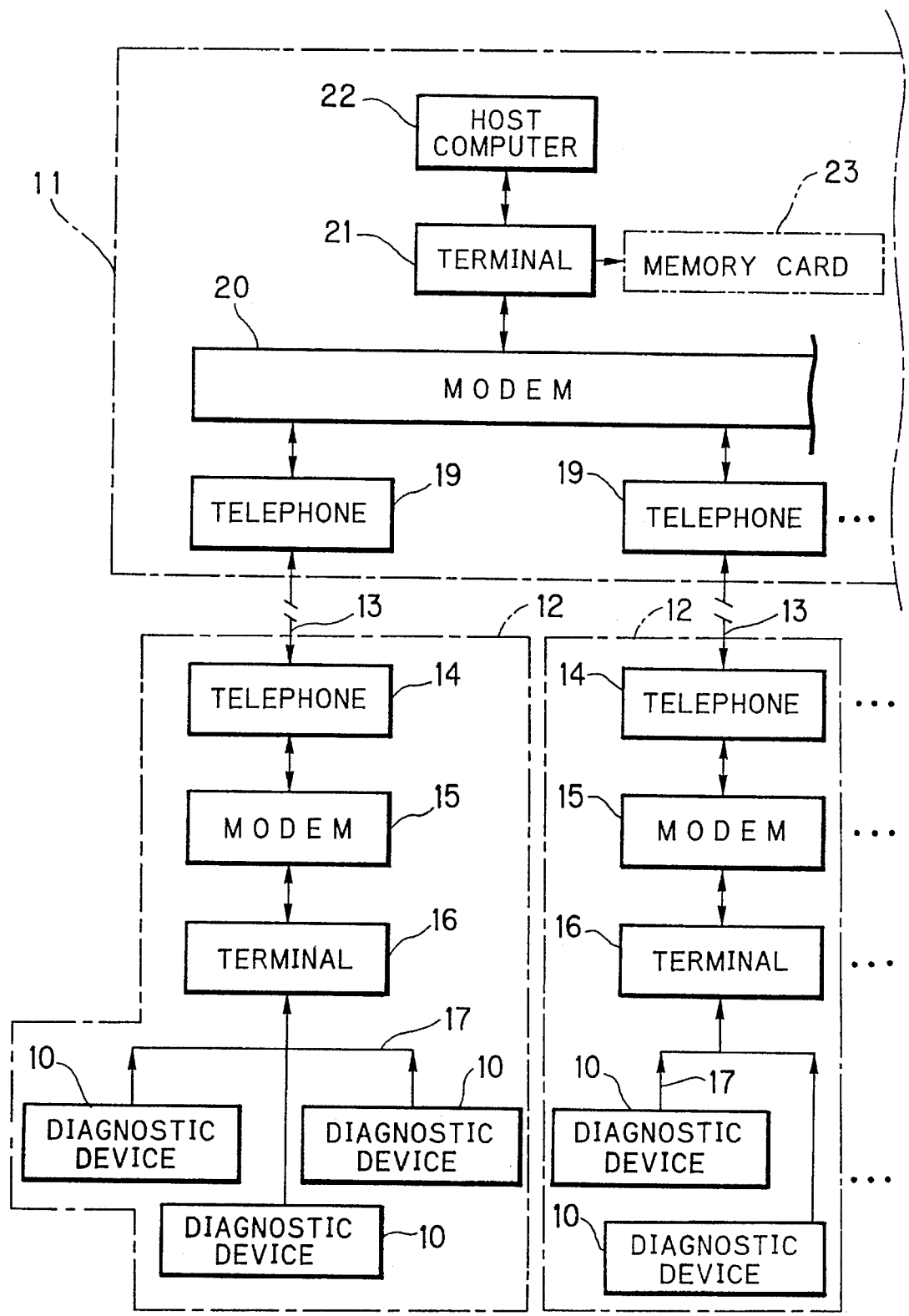
FIG. 1 is a block diagram of a data communication system according an embodiment of the invention.

FIG. 1 shows a preferred embodiment of a data communication system for use with diagnostic devices 10. The data communication system is utilized for sending repair data between a technical headquarters 11 of a manufacturer and individual offices including branch offices and agencies over telephone lines 13. Telephones 14 set in the respective offices 12 are selectively connected to modems (modulators/demodulators) 15, and each modem is connected to a terminal 16 for data communication.

The terminal 16 can be connected to a plurality of diagnostic devices 10 through a bus line. The diagnostic device 10 is, for example, a portable electronic diary or a portable terminal which can store repair data and send the stored repair data to the terminal 16. The terminal 16 sends the repair data received from the diagnostic device 10 to the technical headquarter 11 over a telephone line 13.

In the technical headquarters 11, a plurality of telephones 19 are connected to a terminal 21 through a modem 20. The terminal 21 sends and receives data to and from a host computer 22 so as to have the host computer 22 store the repair data having been sent from the respective terminals 16. The modems 15 and 20 convert direct current digital signals from the terminals 16 and 21 into alternating current analog signals, or convert the analog signals into the digital signals in a known manner.

The repair data stored in the host computer 22 is read through the terminal 21 to statistically process the repair data in the interest of making a countermeasure map in which many types of failure codes representing various failures are each associated with at least a countermeasure code representing a possible countermeasure and a probability of success of the possible countermeasure, for example, as shown in FIG. 5. The countermeasure map is written in memory cards 23, for example, IC memory cards. The memory cards 23 are delivered to the respective offices. The repair data stored in the host computer 22 is also utilized as data for improvement and development of machines, for example photographic processors, in the technical headquarters 11.

Figure 2:
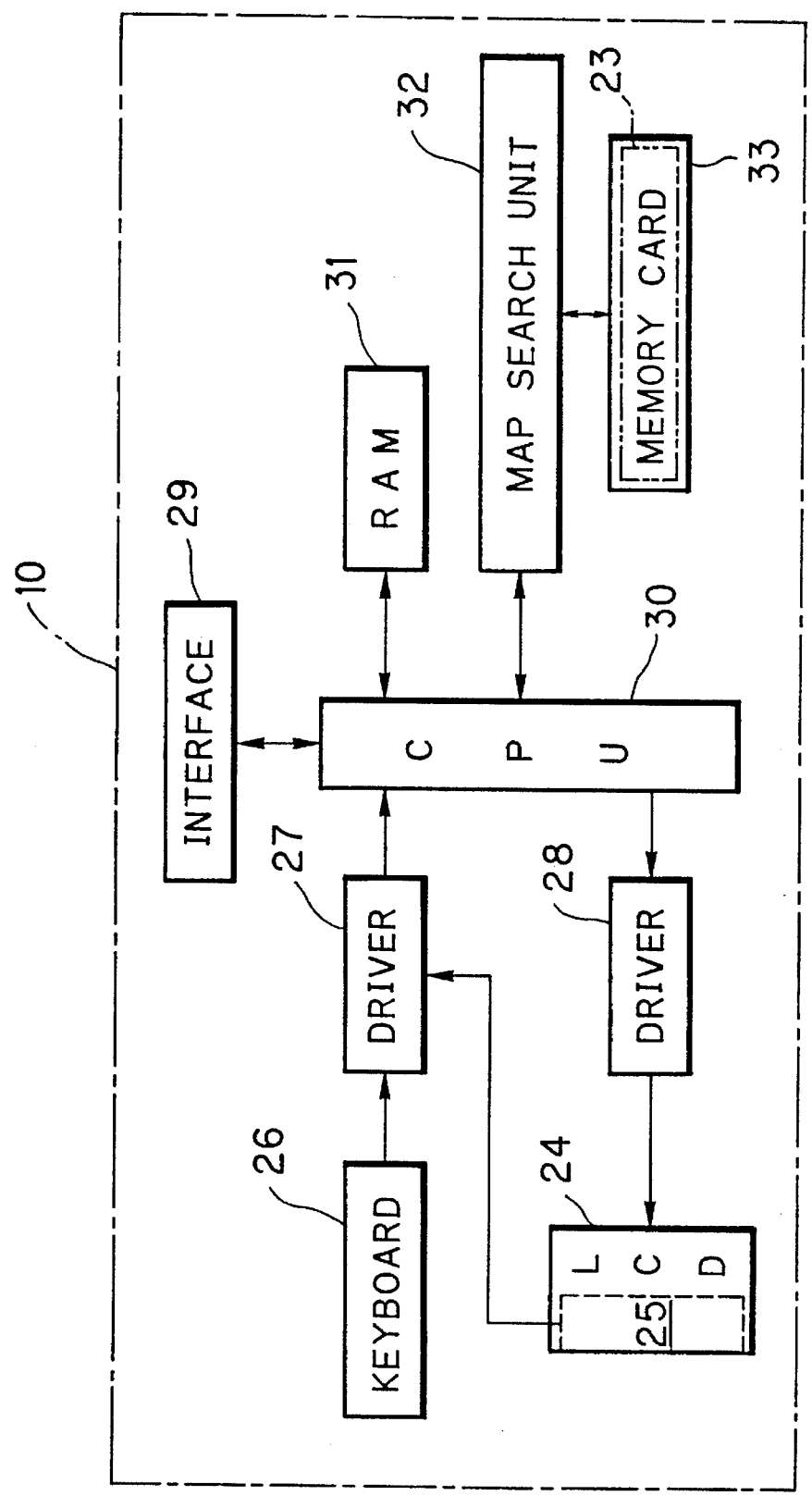
FIG. 2 is a block diagram of a diagnostic device according to an embodiment of the present invention.

FIG. 2 schematically shows an embodiment of the diagnostic device 10. The diagnostic device 10 is portable in size, and is constituted of a liquid crystal display (LCD) panel 24 fitted with a touch panel sensor 25, a keyboard 26, drivers 27 and 28, an interface 29, CPU 30, RAM 31, a map search unit 32 and a memory card loading section 33.

The CPU 30 controls the drivers 27 and 28, the interface 29, the RAM 31, the map search unit 32 and the memory card loading section 33. The RAM 31 stores repair data inputted through the touch panel sensor 24 for each failure having been dealt with by the diagnostic device 10. The repair data includes at least a machine type code, a failure code, a countermeasure code and a result code. The machine type code represents the type of the photographic processor having a failure, the failure code represents the symptoms and the location of the failure, and the countermeasure code represents the taken countermeasure and/or changed parts. Machine types, failures and countermeasures are individually classified to allocate a code to each classification. The result code indicates whether the failure is corrected or not. The former case (corrected) is represented by a code "OK", and the latter case (not corrected) is represented by a code "NG". It is possible to add other codes, for example, an outlet code and an ID number of the photographic processor, to the above mentioned codes, to total the failures for each outlet or processor, or the like.

The memory card 23 storing the countermeasure map is removably loaded in the memory card loading section 33, and data of the countermeasure map can be read from the memory card 23 in this position. The map search unit 32 searches the countermeasure map for an optimum countermeasure code in accordance with a machine type code and a failure code inputted as a search code.

Figure 3:
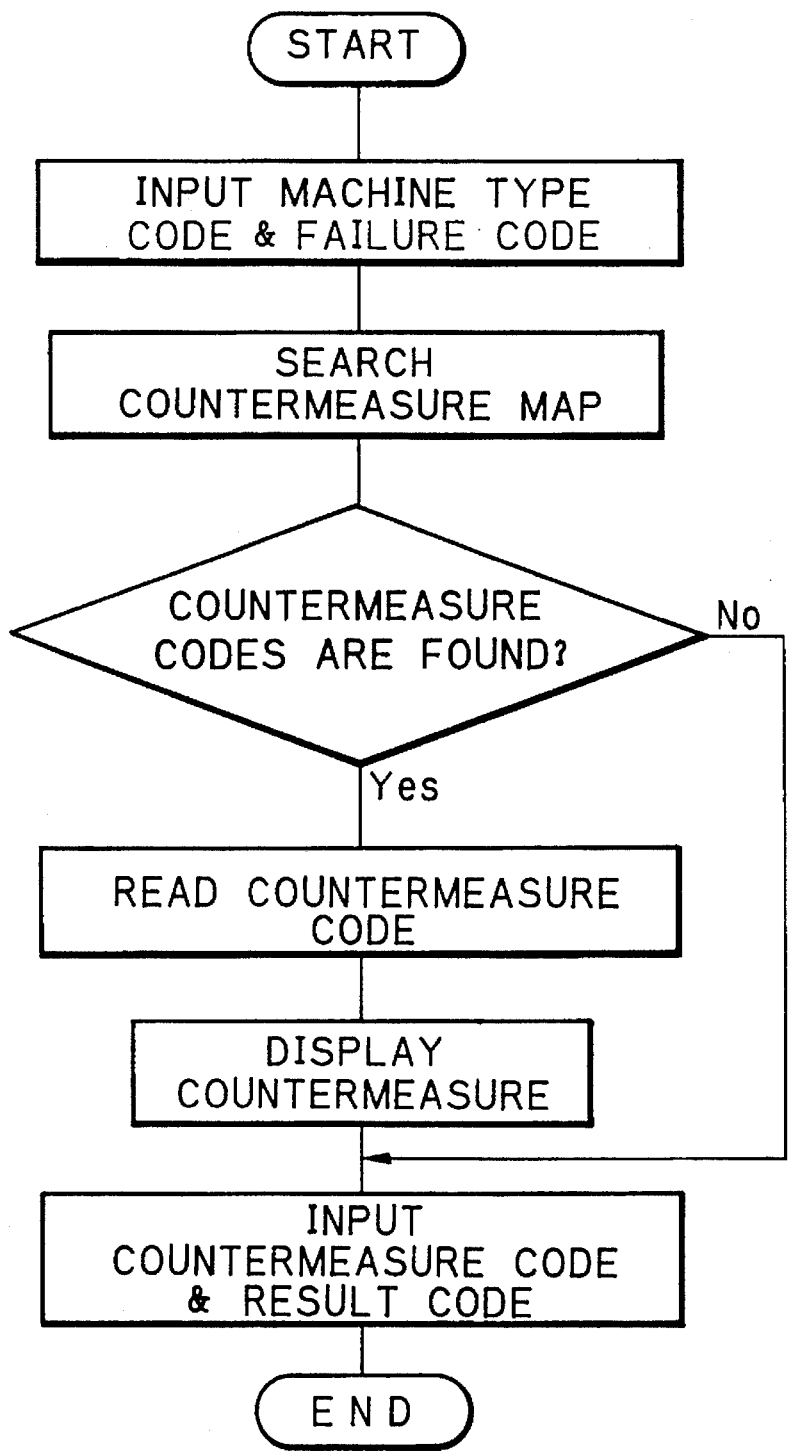
FIG. 3 is a flowchart illustrating procedures in the diagnostic device.

The operation of the embodiment as set forth above will be described with reference to the flowchart of FIG. 3. When a user, for example, a small photofinishing laboratory (or mini-lab) request a repair, the repairer takes the diagnostic device 10 to the mini-lab. In the mini-lab, the repairer observes the symptoms of the failure of a photographic processor and inputs the machine type code of the photographic processor and a failure code corresponding to the failure by means of the touch panel sensor 25 in a menu selection method. That is, when a power switch is turned on, names of several type machines are displayed on the LCD panel 24 to allow selection of a corresponding type from among these types. By touching the name of the selected type, the corresponding machine type code is inputted. Next, various items of failures are displayed in turn in the order from large, middle and small classifications. Based on sequential selection of an appropriate item in each classification, the corresponding failure code is generated. In this way, a search code consisting of the machine type code and the failure code is determined. In a case where the machine type code is "0001" and the failure code is "AAAA", the search code is given as "0001AAAA".

The search code is fed to the map search unit 32, whereupon the map search unit 32 searches the countermeasure map for at least one countermeasure code assigned to the search code. When, for example, three countermeasure codes assigned to that search code are retrieved from the countermeasure map, the three countermeasures are displayed along with the data of the machine type and its failure on the LCD panel 24, as is shown in FIG. 4. It is to be noted that the countermeasures are displayed as manually readable items, though they are shown as codes "X", "Y", "C" in FIG. 4 for simplicity It is also displayed on the LCD panel that the failure of this case will be corrected at a probability of 86% if the countermeasure "X" is taken, and at a probability of 50% if the countermeasure "Y" is taken, whereas the success probability of the countermeasure "C" is 33%. These percentages are calculated in a known manner based on data representing previous repairs.

The repairer adopts measures to cope with the failure with reference to the displayed countermeasures. After taking each countermeasure, the repairer inputs the countermeasure code corresponding to the taken countermeasure along with the result code representing the result of the taken countermeasure (i.e., problem corrected or problem not corrected) through the touch sensor panel 24 in the same menu selection method as described with respect to the search code. In this way, a unit of repair data including the machine type code, the failure code, the countermeasure code and the corresponding result code, is provided.

For example, if the countermeasure code "X" and the result code "OK" are inputted, these codes are combined with the previously inputted machine type code and the failure code "0001" and "AAAA", so that the repair data is given as "0001AAAAXOK". The repair data is written in the RAM 31. In this way, the RAM 31 serially stores the repair data in a manner as shown in FIG. 6, each time a countermeasure is taken for a failure.

It is to be noted that the search code and the repair data may be inputted through the keyboard 26 in form of the codes, or displayed in form of the codes. In these cases, a code list is necessary for reference. Also, bar codes, or the like, can be used as input data.

The repair data stored in the RAM 31 of the diagnostic device 10 is sent to the host computer 22 of the headquarters 11 over the telephone line 13 by connecting the diagnostic device. 10 to the terminal 16 of the office 12 through the bus line 17, at a given interval, for example, every day, every week or the like. The host computer 22 stores a large amount of repair data having been sent from the respective offices 12. In the headquarter 11, the repair data stored in the host computer 22 is read through the terminal 21 to generate a new version of the countermeasure map. The countermeasure map is thus revised at a predetermined interval based on newly collected data. Specifically,, the probability of success of a countermeasure assigned to an individual failure is obtained as a percentage of the number of result codes "OK" relative to the total number of the same combinations of the countermeasure code with the failure code. Countermeasure codes are sorted in the order from those having higher success probabilities in each associated failure code. Because the success probability is calculated, it is possible to select an optimum countermeasure code for each failure code.

The revised memory cards 23 are forwarded to the respective offices to concurrently load the most recently revised memory card 23 in each diagnostic device 10. Therefore, the repairers can retrieve the optimum countermeasure from the latest countermeasure maps. The repair data stored in the host computer 22 is also utilized for analyzing the cause of failure, improving the photographic processors and developing new ones.

Of course, repair data ,does not exist when putting new models of machines on the market. In this case, a standard countermeasure map for the new machines may be produced during the stage of developing and designing the new machines or during the stage of manufacturing the same, to supply the offices with the standard countermeasure map simultaneously with the start of sales.

Although the countermeasure map produced by the host computer 22 is written in memory cards which are supplied to the respective offices 12, it is possible to send the data of the countermeasure map to the terminals 16 of the offices over the telephone lines 13. In this case, the countermeasure map is written in a map memory such as a memory card by connecting the diagnostic device 10 to the terminal 16.

Since the diagnostic devices 10 are always carried by the repairers, the diagnostic devices 10 may also be utilized for inputting order data from customers or outlets, for example, the required number and the code of the ordered consumables or replacements. The order data can be inputted through the keyboard 26 and written in the RAM 31. The order data may be sent to the host computer 22 of the technical headquarter 11 by connecting the diagnostic device 10 to the terminal 16 of the office 12. The order data is then sent from the host computer 22 to a computer of a forwarding department of the manufacturer to make a hard copy of the order data from customers or outlets, for example, the required number and the code of the ordered consumables or replacements. The order data can be inputted through the keyboard 26 and written in the RAM 31. The order data may be sent to the host computer 22 of the technical headquarter 11 by connecting the diagnostic device 10 to the terminal 16 of the office 12. The order data is then sent from the host computer 22 to a computer of a forwarding department of the manufacturer to make a hard copy of the order data. In this way, the necessary consumables or the replacements can be accurately and promptly forwarded to the customers or outlets.

The data may be stored and transmitted in any known format. Also, the data may be directly downloaded/uploaded to/from a host computer without the use of modems.

The invention has been described through a preferred embodiment. However, it will be apparent to those skilled in the art that various modifications can be made without departing from the scope of the invention as defined by the appended claims.

What is claimed is:

1. A diagnostic device for determining countermeasures to a failure of a machine, comprising:

a map memory storing a countermeasure map, in which failure codes, representing various symptoms of failures, are each associated with at least a countermeasure code representing a possible countermeasure and probability data indicating a probability of success of said possible countermeasure;

data input means allowing data to be input into the diagnostic device in form of codes;

search means for searching said countermeasure map in response to a search code input through said data input means, said search code including a first one of said failure codes which corresponds with said failure of said machine, said search means reading at least a first one of said countermeasure codes which are assigned to said first failure code; and display means for displaying at least data of a first countermeasure stored in said map memory in correspondence with said first countermeasure code along with the probability data stored in said map memory in correspondence with said first countermeasure code.

2. A diagnostic device as recited in claim 1, further comprising a data memory for storing repair data inputted through said data input means after taking said first countermeasure, said repair data being constituted of at least said first failure code, said first countermeasure code, and a result code representing whether or not said first countermeasure was successful.

3. A diagnostic device as recited in claim 2, wherein said countermeasure map is compiled by statistically processing said repair data collected from said data memories of a plurality of said diagnostic devices.

4. A diagnostic device as recited in claim 3, wherein said search code further includes a machine type code inputted through said data input means, said machine type code representing the type of said machine to be repaired.

5. A diagnostic device as recited in claim 4, wherein said data input means includes a touch panel sensor incorporated into said display means, and said display means sequentially displays manually readable items of machine types, types of failures, countermeasures and the results of the countermeasure taken, to permit inputting said search code and said repair data by selectively touching said items on said display means.

6. A diagnostic device as recited in claim 5, wherein said map memory is a memory card removably loaded in said diagnostic device.

7. A diagnostic device as recited in claim 6, wherein said data input means further includes a keyboard.

8. A diagnostic device as recited in claim 7, wherein said display means is a liquid crystal display panel.

9. A data communication system for providing communication between a plurality of diagnostic devices and a host computer, comprising:

a terminal connectable to said diagnostic devices; and a modem coupled to said terminal for connecting said terminal to said host computer, through a telephone line, to send repair data from said diagnostic devices to said host computer over said telephone line, said repair data comprising at least a failure code representing a symptom of failure, a countermeasure code representing a countermeasure taken for said failure and a result code representing whether said countermeasure succeeded or not, said host computer statistically processing said repair data to make a countermeasure map in which many kinds of failure codes representing various symptoms of failures are each associated with at least a countermeasure code representing a possible countermeasure and data representing a probability of success of said possible countermeasure.

10. A data communication system as recited in claim 9, wherein said diagnostic device comprises:

a map memory storing said countermeasure map;

data input means for allowing data to be input into said diagnostic device;

search means searching said countermeasure map in response to a search code input through said data input means, said search code including a first one of said failure codes which corresponds with a symptom of a failure of a machine to be repaired, so as to read at least a first one of said countermeasure codes which are stored in said map memory in correspondence with said first failure code;

display means for displaying at least data of a first countermeasure stored in said map memory in correspondence with said first countermeasure code along with the data indicating a probability of success of said first countermeasure stored in correspondence with said first countermeasure code; and a data memory for storing repair data constituted of at least said first failure code, said first countermeasure code, and a result code representing whether or not said first countermeasure was successful.

11. A data communication system as recited in claim 10, wherein said host computer writes said countermeasure map in a memory card through a terminal while said memory card is coupled to said terminal, and said memory card is removably loaded in each of said diagnostic devices so as to provide access to said map memory by said diagnostic services.

12. A data communication system as recited in claim 11, wherein said countermeasure is sent from said host computer to each of said diagnostic devices through said data communication system so as to write said countermeasure map in said map memory.

* * * * *